United States Patent [19]
Potts

[11] 3,981,407
[45] Sept. 21, 1976

[54] CONE LABELING, SEPARATING AND RESTACKING APPARATUS AND METHOD
[76] Inventor: Robert G. Potts, 3007 Dodson Ave., Chattanooga, Tenn. 37406
[22] Filed: Aug. 15, 1974
[21] Appl. No.: 497,554

[52] U.S. Cl. .............................. 214/8.5 E; 156/293; 156/541; 156/569; 221/221; 221/278
[51] Int. Cl.² ...................... B65G 59/00; B65H 3/08
[58] Field of Search ........... 156/247, 249, 285, 293, 156/294, 297, 306, 344, 358, 361–363, 444, 497, 540, 541, 542, 556, 566, 569, 572, 584; 214/8.5 R, 8.5 E, 152; 221/278, 221

[56] References Cited
UNITED STATES PATENTS

| | | | |
|---|---|---|---|
| 2,543,323 | 2/1951 | Marsh | 156/358 |
| 2,578,329 | 12/1951 | Von Hofe | 156/572 |
| 2,672,991 | 3/1954 | Peters | 221/278 |
| 2,734,657 | 2/1956 | Drese | 221/278 |
| 2,926,808 | 3/1960 | Long | 156/572 |
| 3,273,750 | 9/1966 | Davy | 221/278 |
| 3,329,550 | 7/1967 | Kucheck | 156/584 |
| 3,450,590 | 6/1969 | Mers | 156/540 |
| 3,489,638 | 1/1970 | Collons | 156/344 |
| 3,769,139 | 10/1973 | Woods | 156/361 |

Primary Examiner—Douglas J. Drummond
Assistant Examiner—John E. Kittle
Attorney, Agent, or Firm—James B. Middleton

[57] ABSTRACT

An automatic cone labeling, separating and restacking apparatus comprising a magazine, loading means for placing a stalk of cones from the magazine into the labeling and separating apparatus, apparatus for placing a label into the larger end of a cone, separating apparatus for separating the labeled cone from the stalk of cones by creating a closed annular space between the labeled cone and the next cone and placing a compressible fluid under pressure within the closed annular space so that the labeled cone is moved to a receiving means, and control means to continue the operation until all cones in the stalk of cones have been labeled, separated, and restacked on the receiving means.

3 Claims, 20 Drawing Figures

CONE LABELING, SEPARATING AND RESTACKING APPARATUS AND METHOD

This invention relates to cone handling apparatus, and is more particularly concerned with an automatic apparatus for placing a label within a cone, separating each cone from a stalk of cones, and restacking the cones.

In the textile industry, yarn or thread is usually wound on a cone. The yarn or thread manufacturer buys large quantities of cones and winds the yarn or thread on the cones. For shipping, the cones are nested together in stalks of cones; and, in the course of shipping the cones become pressed so firmly together that they are quite difficult to separate.

In the past, the yarn or thread manufacturer has employed people to separate the cones manually, which has often been extremely difficult due to the tight fit of the nested cones. After the cones are separated, the cones have been individually labeled by a person's manually peeling a label from its backing sheet, and placing the label inside the larger end of the cones. The entire process is both difficult and time consuming, and can be quite expensive in view of the large number of cones used by any one thread or yarn manufacturer.

The present invention overcomes the above-mentioned and other difficulties with the prior method of separating and labeling cones by providing automatic apparatus for receiving a stalk of cones from a supply of cones, stripping the label from its backing sheet and placing the label within the larger end of a cone, then separating the labeled cone from the stalk of cones and propelling the labeled cone to a receiving means where the label is pressed into place. The process is repeated until all cones in one stalk of cones have been labeled, separated and restacked whereupon another stalk of cones is fed to the device and the process is repeated. The separating apparatus includes means for creating an enclosed space between two contiguous nested cones and pressurizing the enclosed space with a compressible fluid to cause the contiguous cones to separate.

These and other features and advantages of the present invention will become apparent from consideration of the following specification when taken in conjunction with the accompanying drawings in which.

Figure 1:
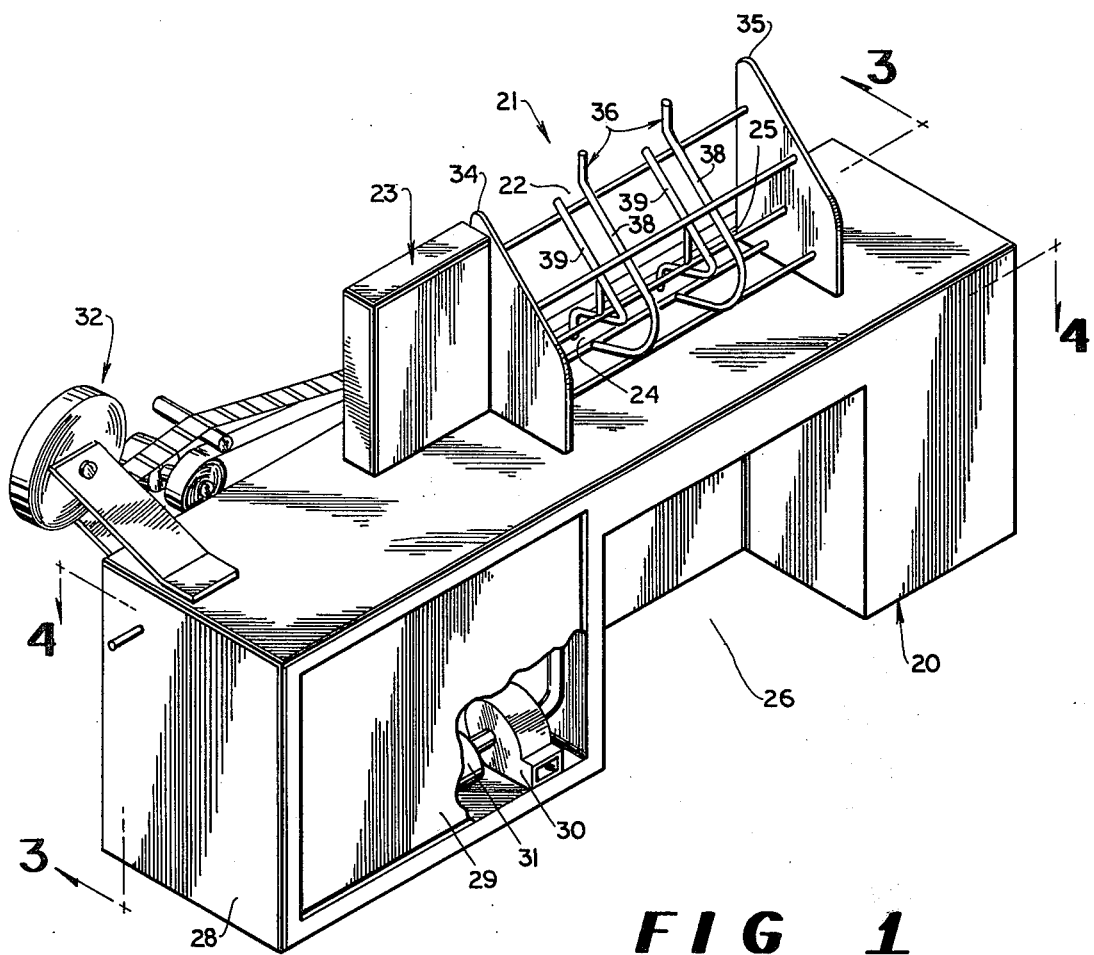
FIG. 1 is a perspective view, partially broken away, of one form of apparatus constructed in accordance with the present invention.

Referring now more particularly to the drawings and to that embodiment of the invention here chosen by way of illustration, it will be seen in FIG. 1 that the embodiment illustrated includes a substantially rectangular housing 20 having a magazine 21 mounted on the upper surface of the housing 20. The magazine 21 has an input zone 22 and a discharge zone 24. The discharge zone 24 is adjacent to the input slot 25 of the cone labeling and separating apparatus as will be discussed more fully hereinafter. The housing 20 also includes a discharge area 26 which is sufficiently large for receipt of a container into which the labeled, separated, and restacked cones can be discharged.

The end 28 of the housing 20 defines a compartment 29 for various control components of the apparatus that will be discussed later, and including a vacuum pump 30 and its motor 31. The upper surface of the end 28 of the housing 20 supports the label feed mechanism generally designated at 32.

Figure 2:
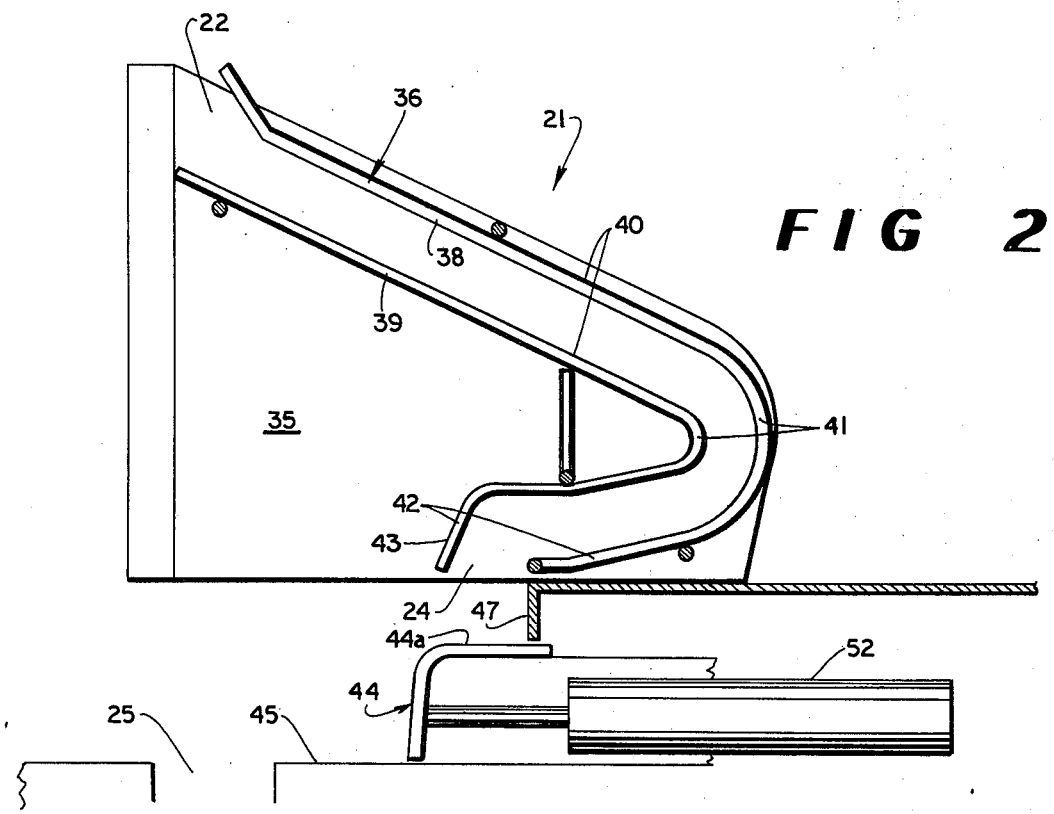
FIG. 2 is a transverse cross-sectional view of the magazine for receiving a plurality of stalks of cones, and illustrating the loading ram in conjunction therewith.

Looking now at the magazine 21 in more detail as shown in FIGS. 1 and 2, the magazine 21 includes a pair of upstanding side members 34 and 35 fixed to the upper surface of the housing 20. The side members 34 and 35 are parallel to each other and are spaced apart a distance sufficient to receive a stalk of cones therebetween.

A plurality of support rods 36 extend between the side members 34 and 35, and the support rods 36 carry a pair of guide members including an outer guide member 38 and an inner guide member 39. The guide members 38 and 39 are spaced apart and are substantially parallel to each other throughout the greater part of their length. At the input 22 of the magazine 21, the outer guide member 38 diverges from the inner guide member 39 to provide for easier insertion of a stalk of cones.

Behind the input 22, the guide members are substantially parallel and spaced apart a distance to receive a stalk of cones, allowing sufficient space for a stalk of cones to roll unhindered between the two guide members 38 and 39. The shape of the guide members 38 and 39 is here shown as including a sloped section 40 beginning at the input 22 and terminating in a hairpin bend 41. The hair pin bend 41 connects the sloped section 40 with a final section 42 that terminates in the discharge 24. It will be understood that the particular shape of the guide members 38 and 39 is largely a matter of choice, the object being to provide a sufficiently long path to store a supply of stalks of cones, and the path can take the shape here illustrated or the path can be virtually any other shape desired.

The discharge 24 is disposed above the upper surface 44a of the loader ram 44 when the loader ram 44 is in its normal position as shown in FIG. 2. The discharge of stalks of cones from the discharge 24 is in a nearly vertical direction so that stalks of cones will be directed down to the upper surface 44a of the ram 44, and the lowermost end 43 of the inner guide member 39 is bent as a stop for the stalks of cones as the stalks of cones roll down the final section 42. Due to the arrangement, one stalk of cones will be resting on the surface 44a while another stalk of cones will be resting on the surface 45. A third stalk of cones will be within the discharge 24 and resting on the stalk of cones that is on the surface 44a.

Thus, when the loader ram 44 moves forward to load the stalk of cones that is on the surface 45, the stalk of cones on the surface 44a can move to allow the stalk of cones within the discharge 24 to fall, thereby placing two stalks of cones on the surface 44a. Then, when the loader ram 44 retracts, or moves back to its normal position, the rearmost stalk of cones on the surface 44a will engage the surface 47 and the forward stalk of cones will fall from the surface 44a to the surface 45, to be in place for the next loading sequence.

Figure 3:
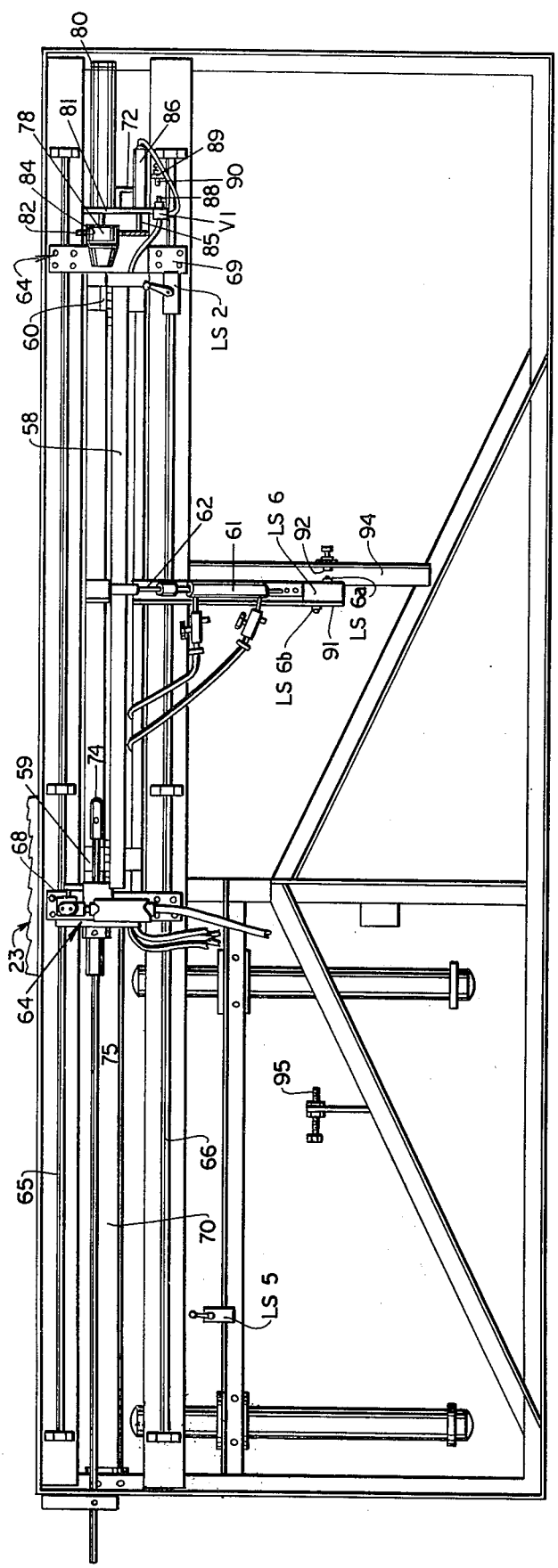
FIG. 3 is a longitudinal cross-sectional view of the apparatus shown in FIG. 1 taken substantially along the line 3—3 in FIG. 1.
Figure 4:
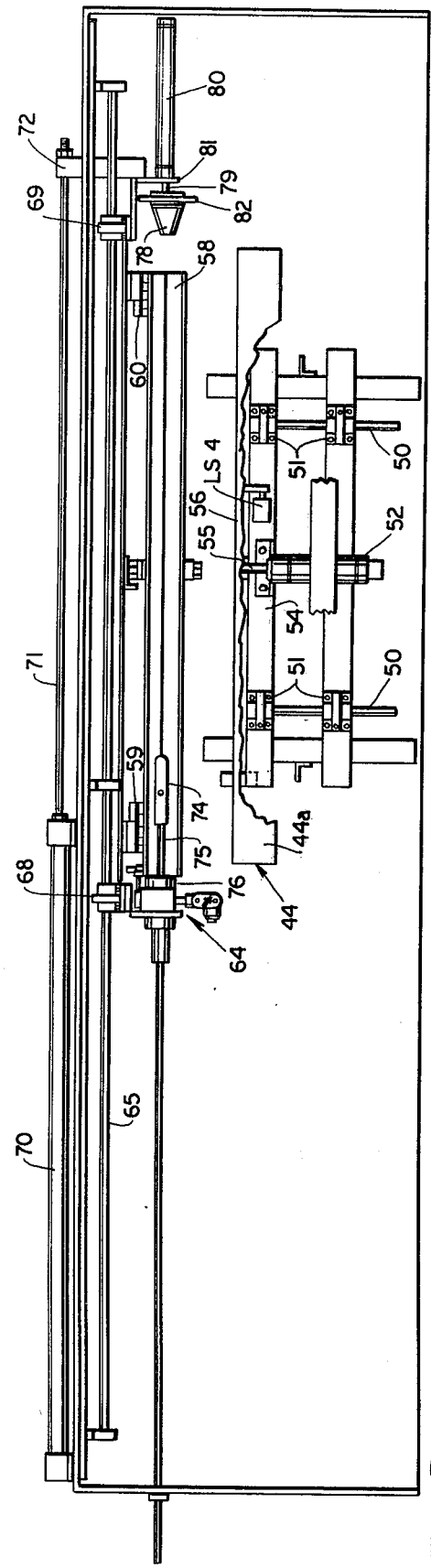
FIG. 4 is a cross-sectional view taken substantially along the line 4—4 in FIG. 1, portions thereof being omitted for clarity.

Attention is next directed to FIGS. 3 and 4 of the drawings for an understanding of the construction of the apparatus. In the following description of the illustrated embodiment of the invention it should be understood that compressed air is used for actuation of the various operating cylinders. Those skilled in the art will realize that other fluids can be used with the appropriate engineering changes, which will be well within the ability of one skilled in the art.

In FIG. 4 of the drawings, the loader ram 44 is shown, but the magazine 21 is removed for clarity. The ram 44 is carried by a pair of shafts 50 extending perpendicularly from the ram 44, each of the shafts 50 being slidably received through a pair of bearings 51. Substantially, midway between the shafts 50 and parallel thereto, an air actuated cylinder, hereinafter referred to as the loader cylinder 52, is mounted. The loader cylinder 52 is fixed to the frame member 54 which carries the forward bearings 51, and the rod 55 of the loader cylinder 52 is fixed to the loader ram 44.

It will thus be seen that when the rod 55 is projected from the loader cylinder 52, the loader ram 44 will move forward, as previously mentioned, over the surface 45. Though much of the frame of the apparatus is omitted for clarity of illustration, it should be understood that the bearings 51 and the loader cylinder 52 are fixed relative to the frame of the apparatus, while the loader ram 44 along with the shafts 50 are moved with respect to the frame. When the rod 55 of the loader cylinder is fully projected, the structural member 56 of the loader ram 44 will engage the actuator of an electrical limit switch designated at LS4. The purpose of the switch LS4 will be discussed later.

When a stalk of cones is urged off the surface 45 by movement of the loader ram 44, the cones are deposited in a tray 58. The tray 58 is pivotally carried by a pair of hinges 59 and 60, and is held in any given position by an air actuated cylinder hereinafter referred to as the dump cylinder 61 shown in FIG. 3 of the drawings.

The tray 58 is a V-shaped member when in the up position as shown in FIGS. 3 and 4, and the tray 58 opens upwardly to receive a stalk of cones. Since the tray 58 is held in its up position by the dump cylinder 61, when the rod 62 of the dump cylinder is retracted, the tray 58 will pivot about the hinges 59 and 60 and cause any cones therein to fall from the tray 58.

It will be noted that the hinges 59 and 60 which carry the tray 58 are mounted on a carriage generally designated at 64. The carriage 64 rides on a pair of traverse rods 65 and 66 by means of bearings 68 on one end of the carriage and bearings 69 on the opposite end of the carriage. The carriage 64 is moved along the traverse rods 65 and 66 by means of a hydraulically actuated cylinder, hereinafter referred to as the traverse cylinder 70, fixed to the frame of the apparatus and having a rod 71 which is connected to a protruding finger 72. The finger 72 is attached to the carriage 64 so that, as the rod 71 is projected or retracted, the carriage 64 and all its appurtenances will be moved along the traverse rods 65 and 66.

A separator nozzle 74 is carried by a supply pipe 75, the supply pipe 75 and the nozzle 74 being stationary relative to the frame of the apparatus. The nozzle 74 is parallel to the tray 58 and is so located that, when a stalk of cones is within the tray 58 with its axis parallel to the tray 58, the nozzle 74 will be co-axially aligned with the axis of the stalk of cones. Thus, with a stalk of cones in the tray 58, when the tray 58 moves towards the nozzle 74, the nozzle 74 will pass through the stalk of cones. This will be discussed more fully hereinafter.

Adjacent to the nozzle 74 as shown in FIGS. 3 and 4 of the drawings there is a cone nose receiver 76. It should be understood that the nose of the cone here referred to is the smaller end. The cone nose receiver 76 has a central opening through which the supply pipe 75 passes; and, as the carriage 64 moves along the traverse rods 65 and 66, the cone nose receiver 76 moves along the supply pipe 75.

At the opposite end of the tray 58, and axially aligned with the cone nose receiver 76, there is a cone base receiver 78. The cone base receiver 78 is carried on the rod 79 of an air operated cylinder hereinafter referred to as the pusher cylinder 80. As best shown in FIG. 4, the pusher cylinder 80 is fixed to a plate 81, the plate 81 being fixed to the carriage 64 for movement with the carriage 64.

The cone base receiver 78 is surrounded by a stripper 82, the stripper 82 being in the form of a plate having a hole 84 therein through which the cone base receiver 78 passed. The stripper 82 is carried by the rod 85 of an air actuated cylinder hereinafter referred to as the stripper cylinder 86; therefore, when the rod 85 of the stripper cylinder 86 is projected, the stripper 82 will move along the cone base receiver 78 to strip cones therefrom. When the stripper 82 is in its outermost position, the stripper 82 will engage the operating arm of a limit switch designated at LS2 which is mounted on the carriage 64.

To operate the stripper cylinder 86, there is a valve V1 mounted on the plate 81 with an operating plunger 88. A fixed bracket 89 threadedly receives a screw 90, and the screw 90 is aligned to engage the operating plunger 88 when the carriage 64 moves the valve V1 towards the bracket 89, so that the screw 90 constitutes a valve operating means.

There is a switch designated as LS6 fixed to the bracket 91 which mounts the dump cylinder 61. A screw 92 is threadedly received by a plate 94 and is in position to engage the operating plunger LS6-A of the switch LS6. The switch LS6 is a single-pole-single-throw switch that is opened by depression of the plunger LS6-A, and the switch is closed by depression of the plunger LS6-B which is on the opposite side of the switch LS6.

To depress the plunger LS6-B, there is a screw 95 similar to the screw 92 but located within the compartment 29 so that the switch LS6 will contact the screw 95 when the carriage 64 is moved to the opposite side of the housing 20. Also, there is a switch LS5 located within the compartment 29 that will be engaged by the carriage 64 at the end of its travel towards the switch LS5.

Figure 5:
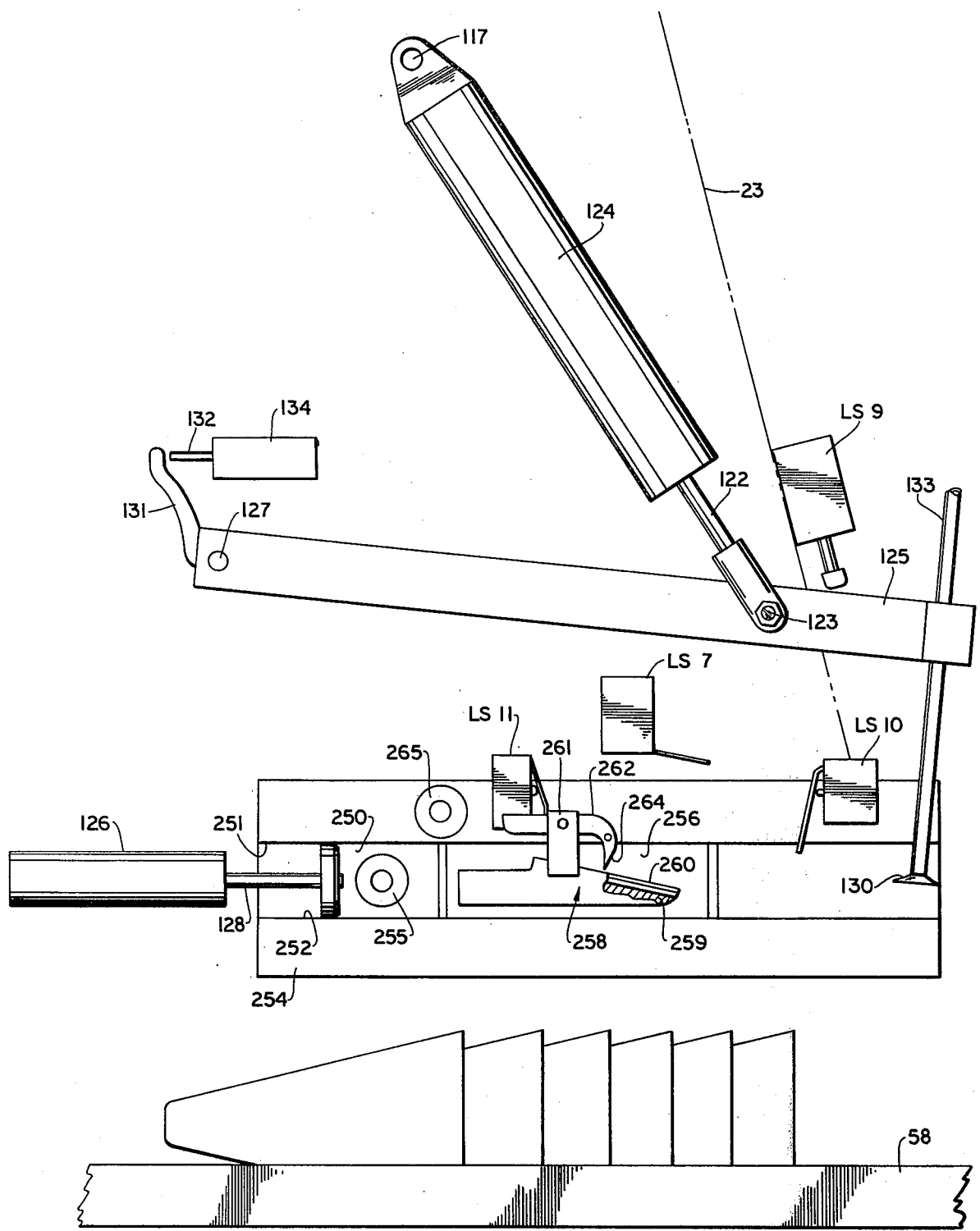
FIG. 5 is an enlarged view showing the labeling apparatus in relation with the separating apparatus.

Attention is now directed primarily to FIG. 5 of the drawings which shows the mechanical arrangement of the labeling apparatus in the embodiment of the invention here chosen by way of illustration of the invention.

It should first be noted that the tray 58 is shown with cones resting within the tray 58, located to receive a label. The sucker 130 comprises a pipe that is movable in an arc between a first position wherein the sucker 130 receives a label to be applied and a second position in which the sucker 130 places a label into a cone. The sucker 130 is carried by a labeler arm 125 for the desired movement, and the labeler arm 125 is pivoted at 127 to allow the oscillating motion.

Movement of the labeler arm 125 is caused by a labeler cylinder 124 having a cylinder rod 122 slidable within the cylinder 124 and pivotally fixed to the arm 125 by means of a screw 123. The labeler cylinder 124 is pivotally carried at its upper end 117 so that it, too, can follow the necessary arcuate path.

The apparatus thus far described is contained within the housing 23 which is shown in FIG. 1 of the drawings, and one wall of the housing 23 is also shown in FIG. 5 where it will be seen that the arm 125 extends beyond the housing 23.

Fixed to the rearmost end of the arm 125 is a finger 131, the finger 131 being in close proximity to the operating plunger 132 of a valve 134. From this arrangement it will be seen that when the rod 122 is projected from the cylinder 124 to cause the labeler arm 125 to move down to its label placing position, the finger 131 will move towards the operating plunger 132 to depress the plunger 132 and open the valve 134. The function of the valve 134 will be better understood in consideration of the fluid circuits to be discussed hereinafter.

The above discussed apparatus will place a label that is on the sucker 130 into a cone that is within the tray 58. The next arrangement to be described is the apparatus to dispense a label and place a label on the sucker 130.

Prior to the labeling movement of the labeler arm 125, the shoe cylinder 126 projects its rod 128. The shoe cylinder rod 128 is connected to a bracket 250 that is slidably mounted in an upper groove 251 and a lower groove 252 of a slide plate 254. A return paper guide roll 255 is rotatably mounted on the bracket 250, extending perpendicularly to the slide plate 254.

Ahead of the bracket 250, and separate therefrom, there is a shoe plate 256 which is also slidable along the slide plate 254. The shoe plate 256 has a shoe 258 fixed thereto and movable therewith.

The shoe 258 comprises a substantially wedge-shaped member 259 having a label peeling plate 260 supported adjacent thereto and parallel to the upper, sloped surface. The arrangement is such that a backing paper having pressure-sensitive labels thereon is passed across the upper surface of the label-peeling plate 260, and the backing paper returns between the plate 260 and the wedge 259. The action of the paper's passing across the edge of the plate 260 causes a label to be peeled from the backing paper.

The shoe 258 includes a U-shaped member 261 fixed to the wedge 259 to provide a bridge; and, the bridge, or member, 261 pivotally supports a feed-dog 262 that is biased to rotate in a clockwise direction as viewed in FIG. 5 to urge the point 264 against the backing paper for the labels.

Now, it will be understood that, when the bracket 250 is moved by projection of the rod 128, the shoe plate 256 and the attached shoe 258 will also be moved by abutment with the bracket 250. A strip of labels will pass under the guide roller 265 and pass between the dog 262 and the plate 260. The dog will engage the rear edge of a label to position the label and cause the entire assembly to move towards the sucker 130.

When the shoe 258 reaches its forwardmost position, the bridge 261 will engage a limit switch LS10, at which time the shoe cylinder 126 will retract its rod 128; however, the shoe plate 256 is not connected to the bracket 250 so that the shoe 258 will not be moved.

After the bracket 250 has moved rearwardly, the rewind motor or other apparatus 239 will be activated to pull the backing paper over the roll 255 and thereby to pull the shoe 258 to the rear. This action will continue until the bridge 261 engages the limit switch LS11.

Figure 8A:
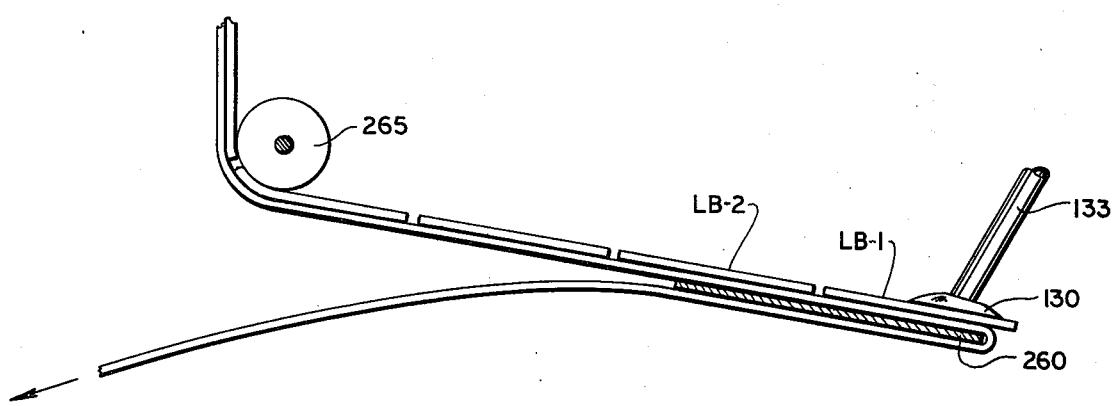
FIGS. 8A–8C are schematic illustrations showing the sequence of operations for the label dispensing apparatus.
Figure 8B:
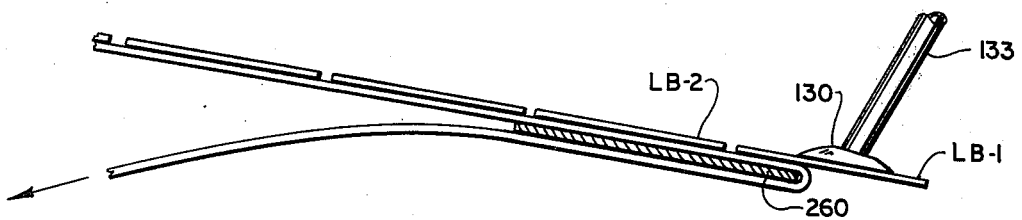
Figure 8C:
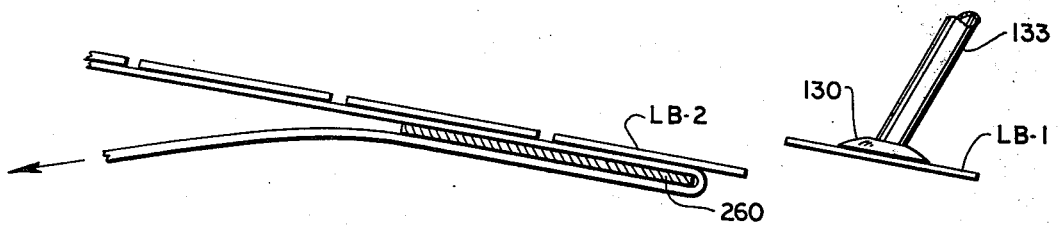

Looking now at FIGS. 8A–8C, the operation for dispensing a label will become more clear. FIG. 8A illustrates the position in which the shoe 258 is in its forward position, and it will be seen that the end label LB1 is in engagement with the sucker 130. At this point, the rewind mechanism 239 is energized so that the backing paper is pulled as indicated by the arrow in FIG. 8A. Thus, as the backing paper is pulled, the shoe 258 as illustrated by the plate 260 is moved away from the sucker 130, but leaving the label LB1 fixed to the sucker 130 held by a vacuum through the sucker 130.

As the motion continues, as shown in FIGS. 8B and 8C, the label LB1 is entirely stripped from the backing sheet and left on the sucker 130, and the next label LB2 is partially stripped from the backing sheet, ready for the next cycle.

Referring again to FIG. 5, once the sucker 130 has a label carried by it, the labeler cylinder 124 causes the labeler arm 125 to move down to place the label within a cone that is in place in the tray 58. When the arm 125 reaches its lowest position, the screw 123 contacts the operating arm of the switch LS7. Also, it should be noted that a switch LS9 is fixed to the housing 23 in such location that, when the arm 125 is in its upper position, the switch LS9 is held in its transferred condition, and when the arm 125 is lowered, the switch LS9 is allowed to return to its normal condition.

Figure 7:
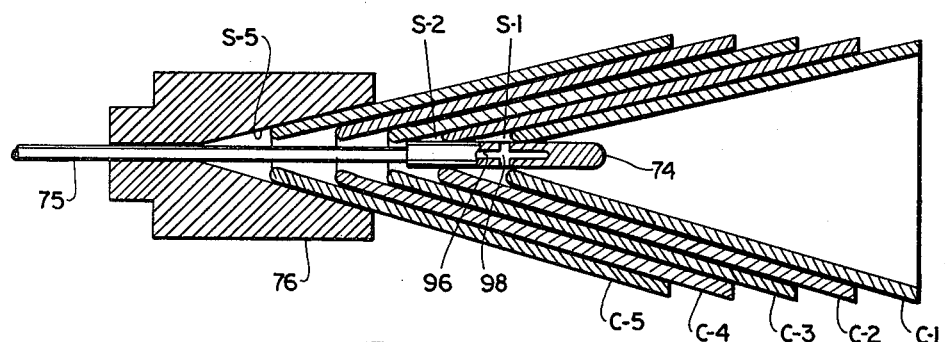
FIG. 7 is an enlarged cross-sectional view of a plurality of cones and showing the separating apparatus.

At this point, an understanding of the technique of separating the cones and the operating order of the apparatus would be helpful. Attention is directed to FIG. 7 of the drawings for a showing of the cone separating technique.

FIG. 7 shows a plurality of nested cones, C1, C2, C3, C4 and C5. The nose of the cone C1 is adjacent to the nose of the cone C2, and lies within the cone C2. Since the base angle of all the cones is the same, and the cones C1–C5 are really frustums of cones, the tip of the nose of the cone C1 is spaced from the tip of the nose of the cone C2, thereby providing a space S1. Similarly, there is a space S2 between the nose of the cone C2 and the nose of the cone C3.

As shown in FIG. 7, the nozzle 74 is inserted into the central opening of the cones; and, the nozzle 74 is of a diameter substantially equal to the diameter of the hole in the nose of each cone. Because of the closeness of fit between the nozzle 74 and the holes in the noses of the cones, the space S1 in a closed annular space. The nozzle 74 has a central passageway 96 that is in communication with the supply pipe 75, and there is an intersecting passageway 98 diametrically across the nozzle 74 that communicates with the passageway 96.

When the cone C1 is to be separated from the cone C2, the passageway 98 is placed within the space S1 and air under pressure is admitted through the supply pipe 75, through the passageway 96, and out through the passageway 98 so that the space 51 is pressurized.

It will be remembered that the cone nose receiver 76 is fixed to the carriage 64, so that the cones C1–C5 cannot move towards the receiver 76; thus, the cone C1, under sufficient pressure within the space 51 will be moved away from the cone C2, thereby separating the cone C1 from the stalk of cones.

After the cone C1 has been separated, the nozzle 74 and the cones C1–C4 will be moved relative to each other so that the passageway 98 will be disposed within the space S2 at which time the cone C2 will be separated in the same manner as the cone C1. When all cones have been separated from one another in this manner, the passageway 98 will be disposed in the space S5 between the cone C5 and the cone nose receiver 76. Pressurization of the space S5 will urge the cone C5 from the cone nose receiver 76.

The operating sequence of the present apparatus can be understood by reference to FIGS. 6A–6I which schematically illustrate the sequential steps.

Figure 6A:
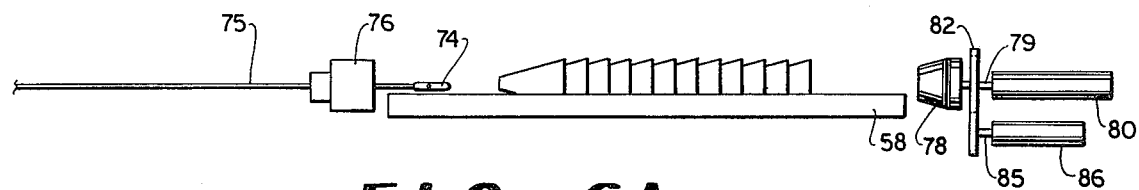
FIGS. 6A–6I are schematic illustrations showing the sequence of operations of the cone labeling, separating and stacking.
Figure 6B:
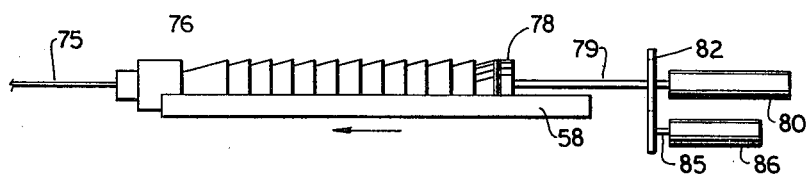

In FIG. 6A, a stalk of cones has been placed in the tray 58 by the loader ram 44. The tray 58 begins to move to the left as viewed in the drawing and, as shown in FIG. 6B, the cone base receiver 78 is projected to compact the cones and urge then tightly into the cone nose receiver 76.

Figure 6C:
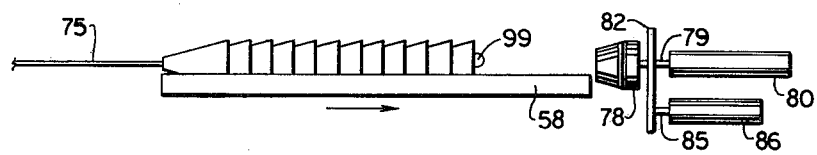
Figure 6D:
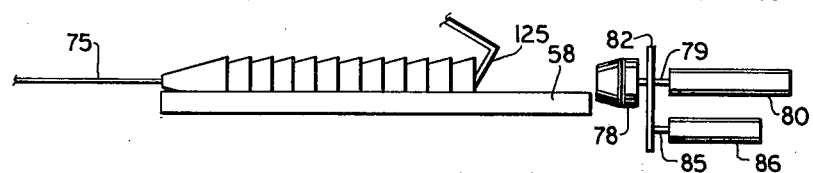
Figure 6E:
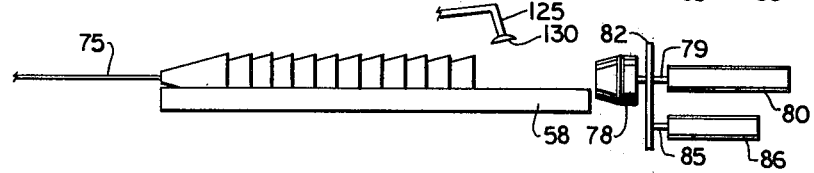

When the carriage 64 has moved fully to the left, it begins to move towards the right as shown in FIG. 6C. The cone base receiver is retracted, and the carriage continues to move until a cone within the tray 58 blocks the light beam to a photoelectric cell 99. At this point, the carriage stops moving and the labeler arm 125 moves down to place a label within the base of the end cone, as shown in FIG. 6D. The labeler arm then moves up, and the end cone is separated as previously described, being projected to the cone base receiver 78.

Figure 6F:
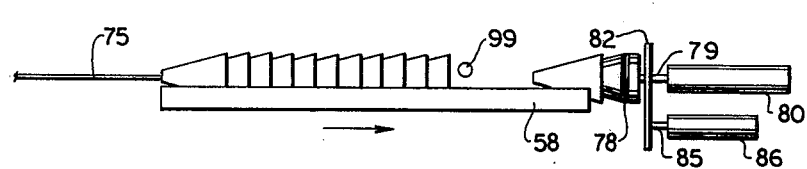
Figure 6G:
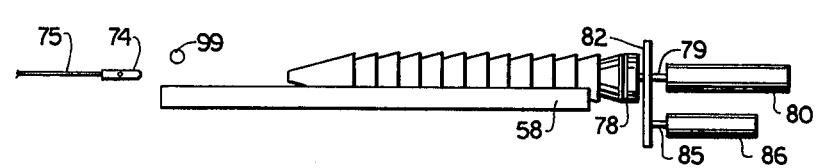

By separation of the end cone, the light beam for the photoelectric cell 99 is no longer blocked, and the carriage 64 once more begins to move so that the condition shown in FIG. 6F is the same as that described in FIG. 6C, and the same procedure is followed. This procedure will be repeated until the last cone is removed from the cone nose receiver 76; then, as shown in FIG. 6G, the light beam for the photoelectric cell 99 will not be blocked again, so the carriage 64 moves to the full opposite position.

Figure 6H:
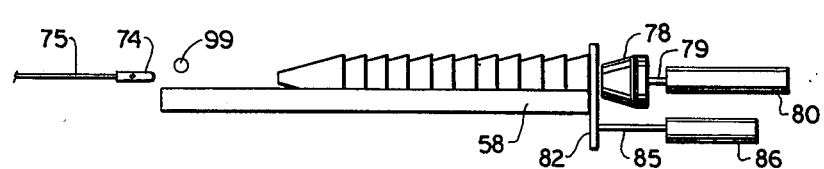
Figure 6I:
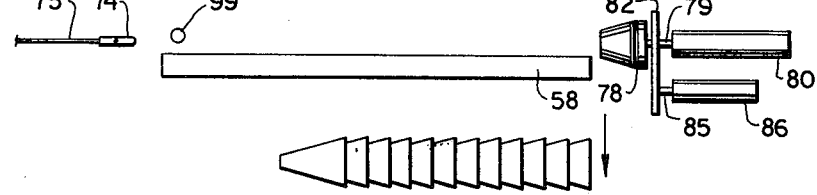

Next, as shown in FIG. 6H, the stripper 82 strips the base of the endmost cone from the cone base receiver, the stripper retracts, and the tray 58 dumps the stacked cones from the tray 58 as shown in FIG. 6I. The apparatus is then ready to load another stalk of cones, and the entire sequence will be repeated.

FLUID SYSTEM

Figure 9:
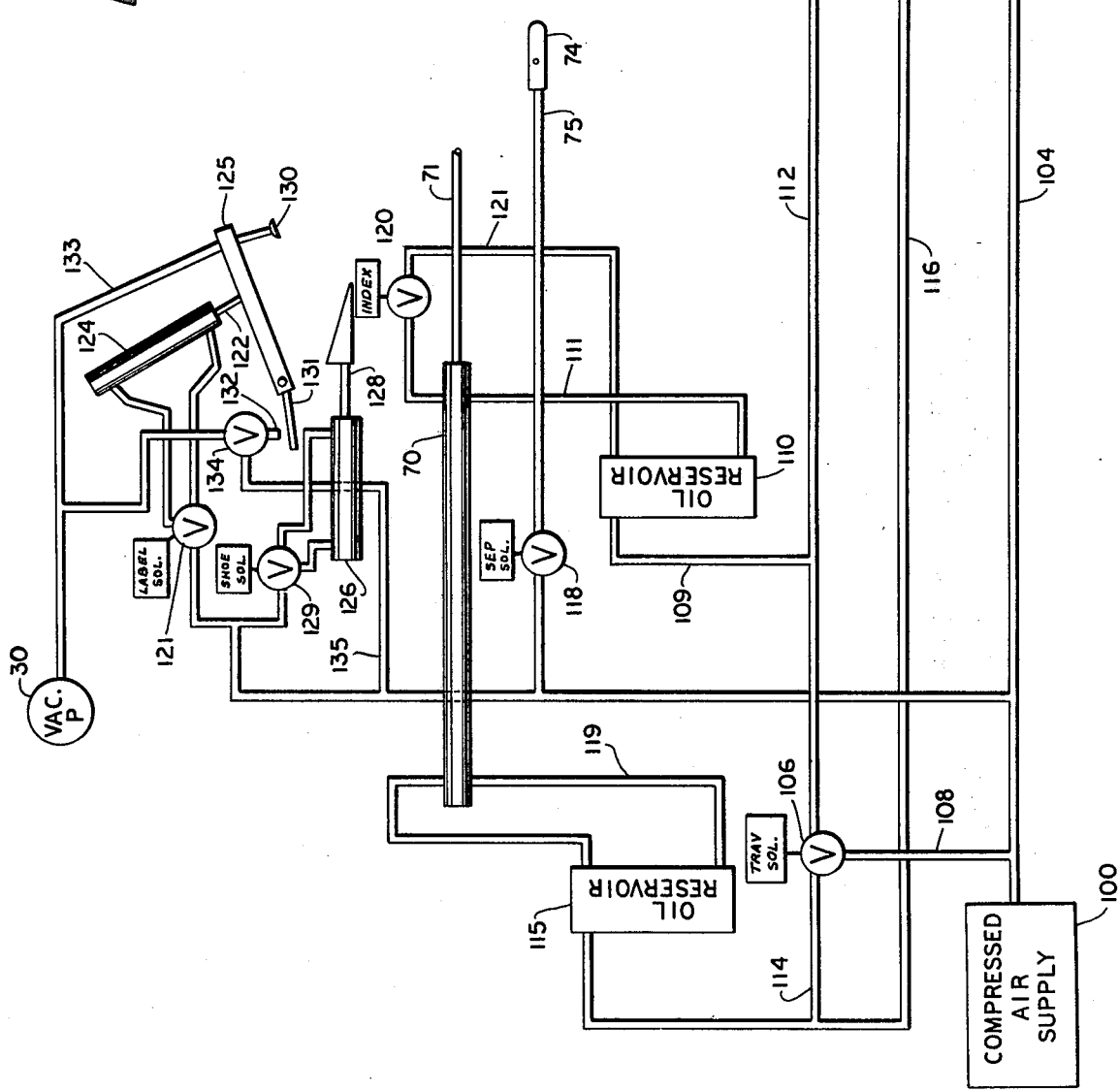
FIG. 9 is a schematic diagram showing the fluid control circuits for apparatus according to the present invention.

The fluid system to operate the various parts of the present apparatus can be understood by reference to FIG. 9 of the drawings. In discussing the fluid system it should first be understood that all of the fluid actuated cylinders utilize valves, as are well known in the art, in which a solenoid operates the valve to direct fluid to one end of the cylinder; and, when the solenoid is deenergized, the valve shifts to direct fluid to the opposite end of the cylinder and reverse the cylinder rod movement.

Looking now at FIG. 9 of the drawings there is a source of air under pressure, indicated at 100. Beginning with the loading of a stalk of cones into the tray 58, the loader valve 102 will be operated to direct fluid from the source 100 along the line 104 to the valve 102, then to the rear of the loader cylinder 52 to project the rod 55. When a stalk of cones is loaded, the valve 102 will be caused to shift and direct fluid through the valve 102, through the line 105 to the front end of the cylinder to retract the rod 55.

Next, the traverse cylinder valve 106 will shift to direct fluid from the source 100, through the line 108, then through the valve 106 and through the line 109 to the top of an oil reservoir 110. The air pressure above oil in the oil reservoir 110 will cause oil to be forced out through the line 111 to the front end of the traverse cylinder 70 to retract the rod 71.

Simultaneously, compressed air will be directed through the branch line 112 to the rear of the pusher cylinder 80 to cause the rod 77 to project. At the end of the travel of the carriage 64 as described above, the valve 106 shifts so that air is directed through the line 114 to the top of an oil reservoir 115 as well as along a branch line 116 to the front end of pusher cylinder 80 to cause the rod 77 to retract.

At this point, however, the separator valve 118 will open briefly so that a short blast of air is directed through the supply pipe 75 and out the nozzle 74. This action places pressure within the cone that is engaged by the cone base receiver 78 and assists in separating the cone from the receiver 78.

When air pressure is placed on the oil reservoir 115, oil will be forced out through the line 119 to the rear of the traverse cylinder 70; and, simultaneously, the index valve 120 will be opened to allow the oil within the traverse cylinder to flow through the return line 121 to the reservoir 110. During the movement of the rod 71 of the traverse cylinder 70, the photoelectric cell 99 will detect a cone and instruct the carriage 64 to stop. The stopping is accomplished by maintaining the air pressure on the oil reservoir 115, but closing the index valve 120. Since the oil within the traverse cylinder 70 is substantially non-compressible, and the exit for the oil is blocked, movement of the rod 71 will cease with no override or the like. Thus, the placement of the carriage 64 by the rod 71 is accurately determinable.

After the carriage 64 stops because a cone has been sensed, a label must be placed in the cone; thus, the labeler valve 121 shifts to project the rod 122 of the labeler cylinder 124 and pivot the labeler arm 125.

Prior to this step, the shoe cylinder 126 has projected its rod 128 under the influence of the valve 129 to feed a label to the sucker 130. Since vacuum is supplied to the sucker 130 through the line 131 from the vacuum pump 30, a label is held to the sucker 130.

Returning, then, to the placement of a label, the sucker 130 places the label within the cone; and, when the arm 125 is in its fully down position, the finger 131 depresses the operating plunger 132 of the valve 134 to allow air under pressure to pass from the line 135, through the valve 134, and into the vacuum line 133. The air under pressure ia sufficient not only to counteract the vacuum provided by the vacuum pump 30, but also to cause a short blast of air through the sucker 130 that will blow the label into place within the cone.

The valve 121 will shift to retract the arm 125, and the valve 118 will open to separate a cone as previously described. Removal of the cone will trigger further motion of the carriage 64 as described, and the entire procedure will be repeated.

After the last cone has been removed from the cone nose holder, the carriage 64 will move until the operating plunger 88 of the valve V1 strikes the screw 90, causing the stripper to strip the cones from the cone base holder 78. The valve 140 will then shift to retract the rod 62 of the dump cylinder 61 to eject the stacked cones from the tray 58, and the apparatus is ready to load another stalk of cones.

ELECTRICAL SYSTEM

Figure 10:
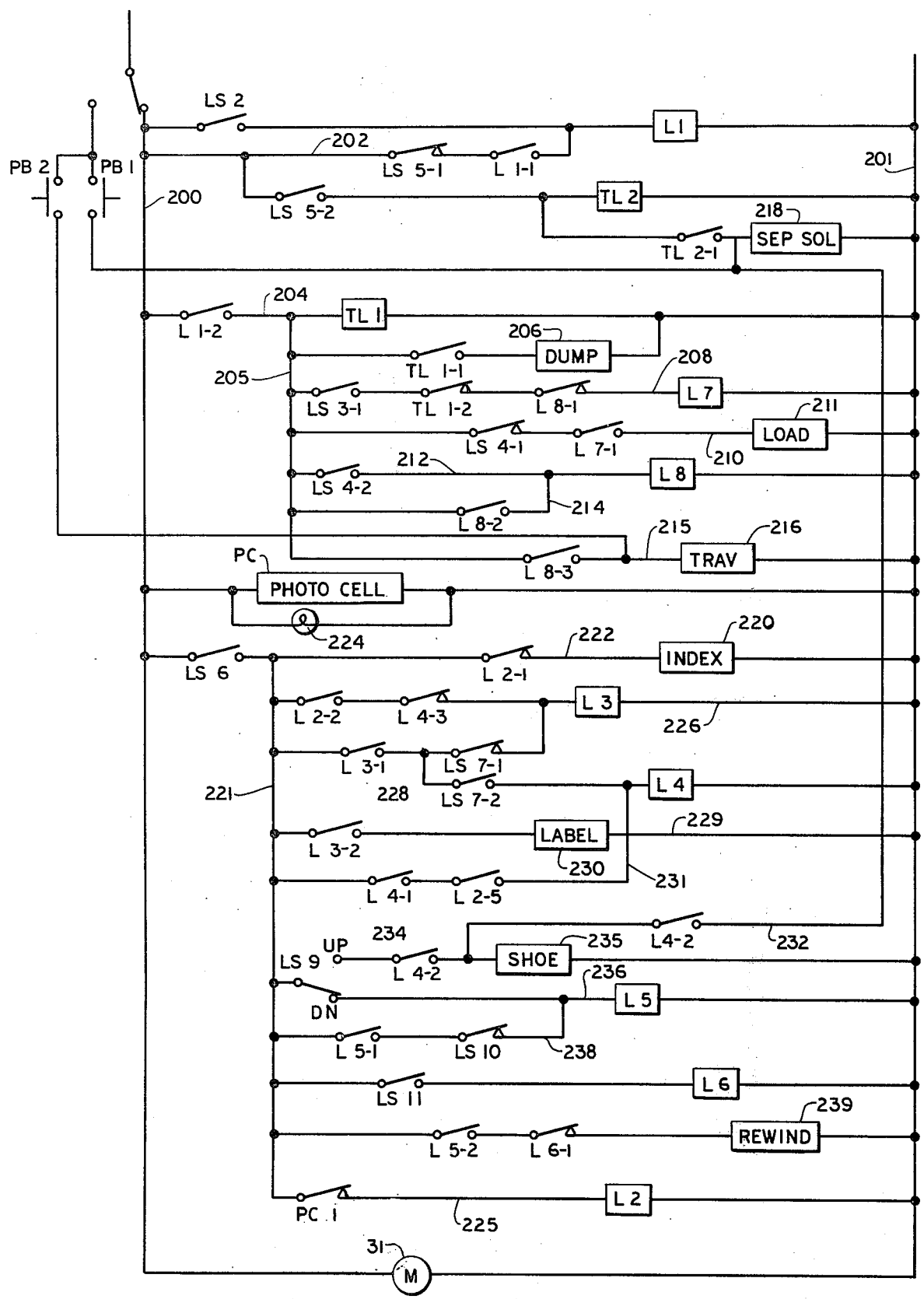
FIG. 10 is a schematic diagram showing the electrical control circuit for apparatus according to the present invention.

The electrical system shown in FIG. 10 provides the control for the valves to operate the fluid system shown in FIG. 9. The electrical system is best understood by assuming that the carriage 64 has just moved so that the valve V1 has been operated to activate the stripper 82, and the stripper 82 operates the switch LS2.

Referring now to FIG. 10, it will be seen that closing switch LS2 energizes relay L1 because the relay L1 is in series with switch LS2 between the electrical power lines 200 and 201. Energizing relay L1 causes the relay contacts L1-1 to close so that the relay L1 is connected to the bus 200 through the contacts L1-1 and through normally closed contact LS5-1 of switch LS5. This branch 202 therefore acts as a holding circuit for the relay L1.

Also, the energizing of relay L1 closes the normally open contact L1-2 in the line 204, which energizes relay TL1. Relay TL1 is a time delay relay of a well known type in which, when the relay is energized, contacts in the relay are closed for a predetermined length of time, then opened even though the coil of the relay is still energized. Here it will be seen that the contact TL1-1 which is closed by the relay TL1 is connected between a secondary bus 205 and the bus 201, the contact TL1-1 being in series with the solenoid 206. When the solenoid 206 is energized, the valve 140 is shifted to cause the dump cylinder 61 to dump the tray 58.

Another branch line 208 is connected between the secondary bus 205 and the bus 201, this line 208 includes a normally closed contact TL1-2 that will be opened when the relay TL1 is energized in order to assure that the relay L7 is not energized; however, at the end of the predetermined time, the contact TL1-2 will again close, the tray 58 will return to its up position because of the opening of the contact TL1-1, and the tab 209 on the tray 58 will operate the switch LS3 to close contact LS3-1. There is a normally closed contact L8-1 in the line 208, so the relay L7 will now be energized.

When relay L7 is energized, contact L7-1 in line 210 will be closed, thereby connecting the secondary bus 205 through a normally closed contact LS4-1, through contact L7-1, through the loader solenoid 211, thence to the bus 201. Energizing the loader solenoid 211 will shift the valve 102 causing the loader cylinder 52 to activate the loader ram 44 and operate the switch LS4. This action will open the contact LS4-1 to reverse the loader cylinder 52, and will close the contact LS4-2 in the line 212 so that relay L8 will be energized to open contact L8-1 in line 208, thereby deenergizing relay L7 and opening contact L7-1 in line 210 to assure that the loader cylinder will not again be actuated. The relay L8 has a holding circuit through its own contact L8-2 through the branch 214.

Further, when relay L8 is energized, the contact L8-3 in the line 215 is closed to energize the traverse solenoid 216 and operate the valve 106, causing the traverse cylinder 70 to move the carriage 64. Since the relay L8 is held by itself, the movement of the carriage 64 will continue until power is removed from the secondary bus 205 by opening of the contact L1-2.

As the carriage 64 continues to move, it will finally engage the switch LS5, thereby opening the contact LS5-1 in the holding circuit of relay L1. Relay L1 will be deenergized and the contact L1-2 in line 204 will open thereby removing the voltage from the secondary bus 205; hence, all of the apparatus heretofore mentioned will be deenergized.

With the operation of switch LS5, the contact LS5-2 will be closed. Contact LS5-2 is in series between the bus 200 and the bus 201 with another time delay relay TL2, and energizing relay TL2 will close the contact TL2-1 for a predetermined length of time to energize the separator solenoid 28 which operates the valve 118.

Due to the valve arrangements as previously described, when the solenoid 216 is deenergized, pressure will be transferred from the oil reservoir 110 to the oil reservoir 115, so the traverse cylinder 70 will attempt to move in the opposite direction. As previously discussed, however, there can be no movement unless the valve 120 is open, and the valve 120 is opened by energizing the index solenoid 220.

When the carriage 64 is moved to the end 28 of the housing 20, the switch LS6 will be closed due to the operation of the plunger LS6-B by the screw 95. When the switch LS6 is closed, the bus 221 will have a voltage applied from the bus 200. The solenoid 220 is in a line 222 between the bus 221 and the bus 201 in series with a normally closed relay contact L2-1; thus, if the switch LS6 is closed, and the relay L2 is not energized, the solenoid 220 will be energized to allow the carriage 64 to move.

Connected between the bus 200 and the bus 201, there is a photoelectric cell with a relay, designated at PC, and including a light source 224 in parallel with the photoelectric cell PC. When the light from the light source falls on the cell, the relay PC will be energized, and when the light is blocked, the relay PC will be deenergized.

There is a relay L2 connected in series with relay contact PC-1 which is operated by relay PC, in the line 225; therefore, when there is no light falling on the photoelectric cell, the contact PC-1 will be closed to energize relay L2, and when the light falls on the photoelectric cell, relay PC will be energized to open contact PC-1 and deenergize relay L2.

Now, when the carriage 64 has engaged the switch LS5, there will be no cones between the light source 224 and the photoelectric cell PC, so the relay PC will be energized to open contact PC-1 so that relay L2 is deenergized. This means that contact L2-1 in line 222 is closed and the index solenoid 220 is energized so the carriage 64 will move.

There will be a stalk of cones in the tray 58, so the end-most cone will eventually block the light to the photoelectric cell PC causing the relay PC to be deenergized to close contact PC-1, energize relay L2 and open contact L2-1. The index solenoid 220 will then be deenergized and motion of the carriage 64 will stop.

The energizing of relay L2 will also close contact L2-2 in the line 226. The line 226 is connected between the bus 221 and the bus 201 so voltage will be applied through the contact L2-2, through the normally closed contact L4-3, to energize relay L3. Relay L3 will close contact L3-1 so that a holding circuit is provided through the branch 228, maintained by relay contact L3-1 and by a normally closed contact LS7-1 of switch LS7.

When relay L3 is energized, contact L3-2 will be closed, and contact L3-2 is in a line 229 in series with the labeling solenoid 230. Solenoid 230 operates the valve 121 to operate cylinder 124 and place a label in a cone.

Movement of the arm 125 engages the switch LS7 to open the contact LS7-1 and close contact LS7-2. Since relay L3 is energized, voltage will be applied through contact L3-1, through contact LS7-2, and to relay L4. Once relay L4 is energized, contact L4-3 in line 226 will be opened, contact LS7-1 is open because arm 125 is down, so relay L3 will be deenergized. Relay L4 is then held through holding circuit 231 through contact L4-1 operated by relay L4, and through contact L2-3 which is closed because relay L2 is energized.

During the above discussed procedure, the label feeding mechanism has fed a label to the sucker so that when the arm 125 moved down for the sequence described, a label was placed within the end-most cone. The label feeding mechanism is controlled by a switch LS9 which is a single-pole-double-throw switch.

When the arm 125 is in its up position, the switch LS9 is in its transfer position to connect the bus 221, through the transfer point of switch LS9 to the line 234, through contact L4-2 which is closed by energizing the relay L4, and to the shoe solenoid 235.

The relay L4 is not energized until the arm 125 moves down to transfer switch LS7, so that, after the arm 125 moves down, then back up to transfer switch LS9, voltage is placed on the line 234 through contact L4-2, and to the shoe solenoid 235. Simultaneously, voltage is placed on the circuit 232 through contact L4-2 to the separator solenoid 218.

Placing the switch LS9 in its normal position completes a circuit to the line 236 to energize relay L5, and relay L5 is held through the holding circuit 238 through contact L5-1 closed by relay L5 and through switch LS10. Relay L5 will therefore be held until the switch LS10 is opened to break the holding circuit 238.

When relay L5 is energized, the contact L5-2 will be closed so that a circuit is completed from the bus 221, through contact L5-2, through the normally closed contact L6-1 of relay L6, and to the rewind control 239. The rewind control is activated until the shoe engages the switch LS11 which energized relay L6 to open the contact L6-1.

From the foregoing discussion it will be seen that the apparatus of the present invention provides an automatic method and apparatus for loading a stalk of cones, placing a label within the endmost cone, then separating the endmost cone from the stalk of cones and receiving the separated cone. The receiving means for the separated cone not only receives the cone and holds it in position to receive the next cone, but also presses the label firmly into place. The next cone to be separated is received over the first cone, and so forth throughout the entire stalk of cones so that the cones in the stalk of cones are labeled, separated and restacked.

While the labeling apparatus has been disclosed as utilizing pressure sensitive labels, it will be understood that other forms of labels could also be used with only slight modification. For example, gummed labels could be used by providing a brief water spray into a cone immediately before a label is deposited into the cone. Similarly, a plain label could be used by applying glue into the cone before deposition of the label.

Thus, it will be understood by those skilled in the art that the apparatus here shown is by way of illustration only, and is meant to be in no way restrictive; therefore, numerous changes and modifications may be made, and the full use of equivalents resorted to, without departing from the spirit or scope of the invention as defined in the appended claims.

I claim:

1. Cone separating apparatus for cones comprising a frustum of a cone and having a conical opening therethrough, each cone defining a nose at the smaller end of said cone and having a small hole therethrough, each cone defining a base at the larger end of said cone and having a large hole therethrough, said small hole and said large hole constituting opposite ends of said conical opening, a plurality of said cones being stacked together into a stalk of cones, said cone separating apparatus including cone base receiving means axially aligned with said stalk of cones to receive said base of a cone after said cone is separated from said stalk of cones, a cone nose receiver aligned with said stalk of cones to receive said nose of a cone at the end of said stalk of cones, means for compressing said stalk of cones including means for moving said cone base receiving means towards said cone nose receiver for causing said stalk of cones to be nested tightly together, means for closing said small hole in two contiguous cones to define an annular space, said means for closing said small hole in two contiguous cones comprising a nozzle having a uniform outside diameter substantially equal to the diameter of said small hole and a length greater than the distance between said small hole in any two contiguous cones, a supply pipe, said nozzle defining an axial passageway therein, said axial passageway being in communication with said supply pipe, said nozzle defining a transverse passageway in communication with said axial passageway and positionable in said annular space for placing said annular space in communication with said supply pipe, a source of fluid under pressure for supplying fluid through said supply pipe to said passageways and for placing fluid under pressure within said annular space sufficient to cause the endmost cone of said stalk of cones to move towards said cone base receiving means, said cone base receiving means receiving the base of said endmost cone.

2. Apparatus according to claim 1, said apparatus further including indexing means for placing said transverse passageway successively between contiguous ones of said cones, said indexing means comprising means for moving said cone nose receiver with respect to said nozzle and towards said cone base receiving means.

3. Apparatus according to claim 2, said transverse passageway of said nozzle being disposable within said cone nose receiver for supplying fluid to a space between said nose of a cone and said cone nose receiver to separate a cone from said cone nose receiver.

* * * * *